Patented Aug. 29, 1950

2,520,586

UNITED STATES PATENT OFFICE 2,520,586

N-SUBSTITUTED CARBAMIC ACID ESTERS

Karl H. Weber and Lowell B. Kilgore, Washington, D. C., assignors, by mesne assignments, to Lowell B. Kilgore and Helen Ford Kilgore, both of Washington, D. C.

No Drawing. Application June 22, 1945, Serial No. 601,076

7 Claims. (Cl. 260—471).

The invention described herein relates to new organic compounds, more particularly to a new class of N-substituted carbamic acid esters and specifically to N-(α-etherified-acetyl) carbamic acid esters.

An object of the present invention is to provide new and useful compounds of the general formula:

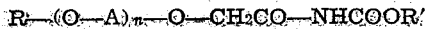

where R is selected from the group consisting of hydrocarbon and halogenated aryl, A is divalent alkylene and n is a small whole number; and R' is selected from the group consisting of hydrocarbon, heterocyclic and radicals of the type R''—O—X— wherein X is divalent alkylene and R'' is a hydrocarbon group. A further object of this invention is the provision of a process for the preparation of these N-(α-etherified-acetyl) carbamic acid esters. Still a further object of this invention is the preparation of new chemicals suitable for combating insects. Other objects and advantages will appear hereinafter.

These objects are accomplished by the following invention wherein N-(α-etherified-acetyl) carbamic acid esters are prepared by reacting the acyl halide of an α-etherified acetic acid with an ester of carbamic acid as follows:

R—(O—A)ₙ—O—CH₂COCl+H₂NCOOR' →
R—(O—A)ₙ—O—CH₂CONHCOOR'+HCl

R and R' may be the same or different organic radicals.

The esters of carbamic acid which are used as starting materials may be made by any one of several known methods, for example, by heating urea with the appropriate alcohol (Organic Syntheses, Coll. vol. I, pp. 140–141, rev. ed., 1941) or by an exchange reaction in which urethane is refluxed with a high boiling alcohol. Similarly the acyl halides of the α-etherified acetic acids employed in this invention may be prepared in known manner.

The new compounds of this invention are obtained by heating together a carbamic acid ester and the acyl halide of an α-etherified acetic acid over varying periods of time depending on the reactivities of the individual components of the reaction mixture. Where necessary a suitable inert diluent such as benzene or toluene may be used. To facilitate the removal of HCl suitable organic bases such as pyridine and the like may be added to the reaction mixture.

The more detailed practice of the invention is illustrated by the following examples which, however, do not limit the scope of the invention in any way.

EXAMPLE 1

Preparation of butyl N-β-butoxyethoxyacetyl carbamate 90 grams of thionyl chloride and 132 grams of β-butoxyethoxyacetic acid dissolved in 500 cc. of benzene were refluxed together for 3 hours. Then excess thionyl chloride was distilled off with 100 cc. of benzene. 88 grams of butyl carbamate were added and the reaction mixture was refluxed for 26 hours. It was then washed successively with water, sodium bicarbonate solution and again water. Distillation of the reaction mixture under reduced pressure yielded 35 grams of butyl N-β-butoxyethoxyacetyl carbamate which boiled at 136–139° C./1 mm.

EXAMPLE 2

Preparation of β-butoxyethyl N-β-butoxyethoxyacetyl carbamate 6 grams of thionyl chloride were added to 9 grams of β-butoxyethoxyacetic acid dissolved in 75 cc. of benzene. After refluxing for two hours, the excess thionyl chloride was distilled off together with 25 cc. of benzene. 8 grams of β-butoxyethyl carbamate dissolved in 20 cc. of benzene were added and the solution refluxed until the reaction was completed. The resulting reaction mixture was then washed successively with water, sodium bicarbonate solution and again water. Distillation under reduced pressure yielded 2.5 grams of β-butoxyethyl N-β-butoxyethoxyacetyl carbamate boiling at 165–170° C./1 mm.

EXAMPLE 3

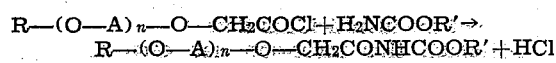

9.1 grams of β'-butoxy-β-ethoxyethoxyacetic acid and 4.8 grams of thionyl chloride dissolved in 75 cc. of benzene were refluxed together for two hours. Excess thionyl chloride was removed by distilling off 25 cc. of benzene. 6 grams of tetrahydrofurfuryl carbamate were added and the solution was refluxed for 33 hours. The resulting reaction mixture was washed successively with water, sodium bicarbonate solution and again water. Distillation under reduced pressure yielded 7.5 grams of tetrahydrofurfuryl N-β'-butoxy-β-ethoxyethoxyacetyl carbamate which boiled at 165–175° C./1 mm.

EXAMPLE 4

Preparation of β-benzoxyethyl N-β-ethoxyethoxyacetyl carbamate 5 grams of β-ethoxyethoxyacetic acid and 4 grams of thionyl chloride dissolved in 75 cc. of benzene were refluxed for two hours. Excess thionyl chloride was removed by distilling off 25 cc. of benzene. 6.7 grams of β-benzoxyethyl carbamate dissolved in 25 cc. of benzene were added and the reaction mixture was refluxed for 28 hours. The resulting reaction mixture was washed successively with water, sodium bicarbonate solution and again water. Distillation under reduced pressure yielded 4 grams of β-benzoxyethyl N-β-ethoxyethoxyacetyl carbamate which boiled at 170–175° C./1 mm.

Other members of the new series of N-α-etherified-acetyl carbamic acid esters which we have prepared by the methods set out in the aforedescribed examples are:

Butyl N-2,3,4,6-tetrachlorophenoxymethoxyacetyl carbamate
Butyl N-β-ethoxyethoxyacetyl carbamate
Dodecyl N-β-ethoxyethoxyacetyl carbamate
Isoamyl N-β-butoxyethoxyacetyl carbamate
β-Phenoxyethyl N-β-butoxyethoxyacetyl carbamate
Phenethyl N-β-butoxyethoxyacetyl carbamate
Cyclohexyl N-β-butoxyethoxyacetyl carbamate
β-Ethoxyethyl N-β-phenoxyethoxyacetyl carbamate
Ethyl N-β-benzoxyethoxyacetyl carbamate
Propyl N-β'-butoxy-β-ethoxyethoxyacetyl carbamate.

The new N-(α-etherified-acetyl) carbamic acid esters as a class possess valuable insect combating properties. When applied in the form of a lotion, spray, cream or salve, they effectively repel such dangerous and annoying pests as flies and mosquitoes.

The table demonstrates the effectiveness of representative members of this new series of organic compounds against the common house fly, *Musca domestica*. The test procedure used was the "sandwich bait" method substantially as described in Soap, June 1939, page 103 ff. A coating of molasses was applied to one side of a strip of blotting paper and dried to a hard, glossy surface. It was covered with a strip of thin, porous tissue which had previously been immersed in a 5 per cent solution in alcohol of the compound to be tested and then dried until the alcohol had evaporated. The concentration of the test solutions was reduced to 5 percent because the repellency of certain members of the series was so prolonged that the flies were in danger of dying before completion of the test. For comparison purposes one strip was treated only with solvent. The strips prepared in this fashion were mounted on a board and introduced into a large cage containing more than 2000 hungry houseflies. By making readings at intervals, the duration of repellency, namely, the time which elapsed before the flies began to feed on the molasses through the treated tissue covers was observed.

TABLE.—N-(α-ETHERIFIED-ACETYL) CARBAMIC ACID ESTERS. REPELLENCY TO HOUSEFLIES IN 5 PERCENT CONCENTRATION

| Compound | Duration of Repellency |
| --- | --- |
| Butyl N-β-ethoxyethoxyacetyl carbamate | 10 hr. 30 min.[1] |
| Butyl N-β-butoxyethoxyacetyl carbamate | 10 hr. 30 min.[1] |
| Isoamyl N-β-butoxyethoxyacetyl carbamate | 5 hr. 45 min. |
| Cyclohexyl N-β-butoxyethoxyacetyl carbamate | 4 hr. 30 min. |
| β-Butoxyethyl N-β-butoxyethoxyacetyl carbamate | 4 hr. 30 min. |
| Tetrahydrofurfuryl N-β'-butoxy-β-ethoxyethoxyacetyl carbamate. | 2 hr. 35 min. |
| Propyl N-β'-butoxy-β-ethoxyethoxyacetyl carbamate. | 2 hr. 35 min. |

[1] Bait still untouched at end of this period. Test terminated to feed flies.

EXAMPLE 5 a. Butyl N-β-butoxyethoxyacetyl carbamate, when applied to the forearm of an individual which was exposed to a cage full of hungry *Aëdes aegypti* mosquitoes, repelled the insects for an average of 182 minutes.

b. Isoamyl N-β-butoxyethoxy acetyl carbamate, when applied to the forearm of an individual which was exposed to a cage full of hungry *Aëdes aegypti* mosquitoes, repelled the insects for an average of 1 hour.

c. Propyl N-β'-butoxy-β-ethoxyethoxyacetyl carbamate, when applied to the forearm of an individual which was exposed to a cage full of hungry *Aëdes aegypti* mosquitoes, repelled the insects for an average of 80 minutes.

These new N-(α-etherified-acetyl) carbamic acid esters may be employed by direct topical application or they may be incorporated into liquid or solid carriers. They are especially useful as the active ingredients of insect-repellent lotions, creams, ointments and the like. They may be dissolved in liquid diluents such as alcohol, aqueous alcohol, ispropanol, dimethyl phthalate and hydrocarbon oils such as kerosene or emulsified in water, if necessary with the aid of a suitable dispersing agent. If desired they may be admixed with finely divided carriers such as diatomaceous earth, talc, pyrophyllite, bentonite, etc.

Furthermore the new compounds of our invention may be combined with insecticidal materials such as pyrethrum, rotenone, derris, cube, DDT and the like. Such a combination is particularly effective where the paralytic and lethal action of the insecticide is slow.

Although this invention has been described with reference to preferred illustrative embodiments thereof it will be apparent to those skilled in the art that the principles of this invention may be embodied in other forms but within the scope of the appended claims.

What we claim is:

1. The N-(α-etherified-acetyl) carbamic acid esters having the formula:

R-(O-A)$_n$-O-CH$_2$CONHCOOR' wherein R is selected from the group consisting of halogenated aryl and hydrocarbon radicals selected from the group consisting of alkyl, aryl and aralkyl, A is divalent lower alkylene and $n$ is a positive integer no higher than 2; and R' is selected from the group consisting of heterocyclic wherein the hetero atom is oxygen, hydrocarbon radicals selected from the group consisting of alkyl, aralkyl and cycloalkyl, and radicals of the type R''-O-X- wherein X is divalent lower alkylene and R'' is a hydrocarbon radical selected from the group consisting of alkyl, aralkyl and aryl.

2. The N-(α-etherified-acetyl) carbamic acid esters having the formula:

Alk-(O-A)$_n$-O-CH$_2$CONHCOOR' wherein Alk is alkyl, A is divalent lower alkylene, $n$ is a positive integer no higher than 2 and R' is selected from the group consisting of heterocyclic wherein the hetero atom is oxygen, hydrocarbon radicals selected from the group consisting of alkyl, aralkyl and cycloalkyl, and radicals of the type R''-O-X- wherein X is divalent lower alkylene and R'' is a hydrocarbon radical selected from the group consisting of alkyl, aralkyl and aryl.

3. Butyl N-β-butoxyethoxyacetyl carbamate.
4. Butyl N-β-ethoxyethoxyacetyl carbamate.
5. Isoamyl N-β-butoxyethoxyacetyl carbamate.
6. The process of preparing N-(α-etherified-acetyl) carbamic acid esters which comprises reacting an α-etherified acetyl halide having the following formula:

R-(O-A-)$_n$-O-CHCOY wherein R is selected from the group consisting of halogenated aryl and hydrocarbon radicals selected from the group consisting of alkyl, aryl and aralkyl, A is divalent lower alkylene and $n$ is a positive integer no higher than 2 and Y is halogen with a carbamic acid ester having the following formula:

NH$_2$COOR' wherein R' is selected from the group consisting of heterocyclic, hydrocarbon radicals selected from the group consisting of alkyl, aralkyl and cycloalkyl, and radicals of the type R''-O-X- wherein X is divalent lower alkylene and R'' is a hydrocarbon radical selected from the group consisting of alkyl, aralkyl and aryl.

7. The N-(α-etherified-acetyl) carbamic acid esters having the formula:

Alk-O-CH$_2$CH$_2$-O-CH$_2$CONHCOOAlk' wherein Alk and Alk' are alkyl.

KARL H. WEBER.
LOWELL B. KILGORE.

REFERENCES CITED

The following references are of record in the file of this patent:

UNITED STATES PATENTS

| Number | Name | Date |
|---|---|---|
| 1,237,413 | Thorp | Aug. 21, 1917 |
| 2,306,599 | Engel et al. | Dec. 29, 1942 |